United States Patent [19]

Schützer

[11] 4,196,745

[45] Apr. 8, 1980

[54] FLAP VALVE

[75] Inventor: Gerhard Schützer, Stuhr, Fed. Rep. of Germany

[73] Assignee: Gustav F. Gerdts KG, Bremen, Fed. Rep. of Germany

[21] Appl. No.: 898,733

[22] Filed: Apr. 24, 1978

[30] Foreign Application Priority Data

Apr. 28, 1977 [DE] Fed. Rep. of Germany ....... 2718281

[51] Int. Cl.$^2$ .............................................. F16K 15/03
[52] U.S. Cl. ................... 137/512.1; 137/527; 251/337
[58] Field of Search ............... 137/512.1, 527, 527.2, 137/527.4, 527.6; 251/337

[56] References Cited

U.S. PATENT DOCUMENTS

| | | | |
|---|---|---|---|
| 1,708,907 | 4/1929 | Spencer | 137/512.1 |
| 3,640,306 | 2/1972 | Vogt | 137/512.1 |
| 3,965,926 | 6/1976 | Buckner | 137/512.1 |
| 4,043,358 | 8/1977 | Sliski | 137/512.1 |

FOREIGN PATENT DOCUMENTS 1076671 7/1967 United Kingdom ................. 137/512.1

*Primary Examiner*—William R. Cline
*Attorney, Agent, or Firm*—Allison C. Collard; Thomas M. Galgano

[57] ABSTRACT

A flap valve is provided which includes a valve housing having a valve seat defined therein, on one side of which is a flow inlet chamber and on the other side of which is a flow discharge chamber, at least one locking element pivotably mounted in the valve housing for movement between an open and closed position relative to the valve seat, and at least one locking spring mounted in the flow inlet chamber of the housing having one portion which is rigidly held in the valve housing and a pivotable lever arm which engages the locking element to urge the locking member into the closed position. The lever arm of the spring and the locking member are slideably coupled together so that the force required to open the locking member increases only slightly or preferably decreases during the opening pivotable movement of the locking member.

7 Claims, 6 Drawing Figures

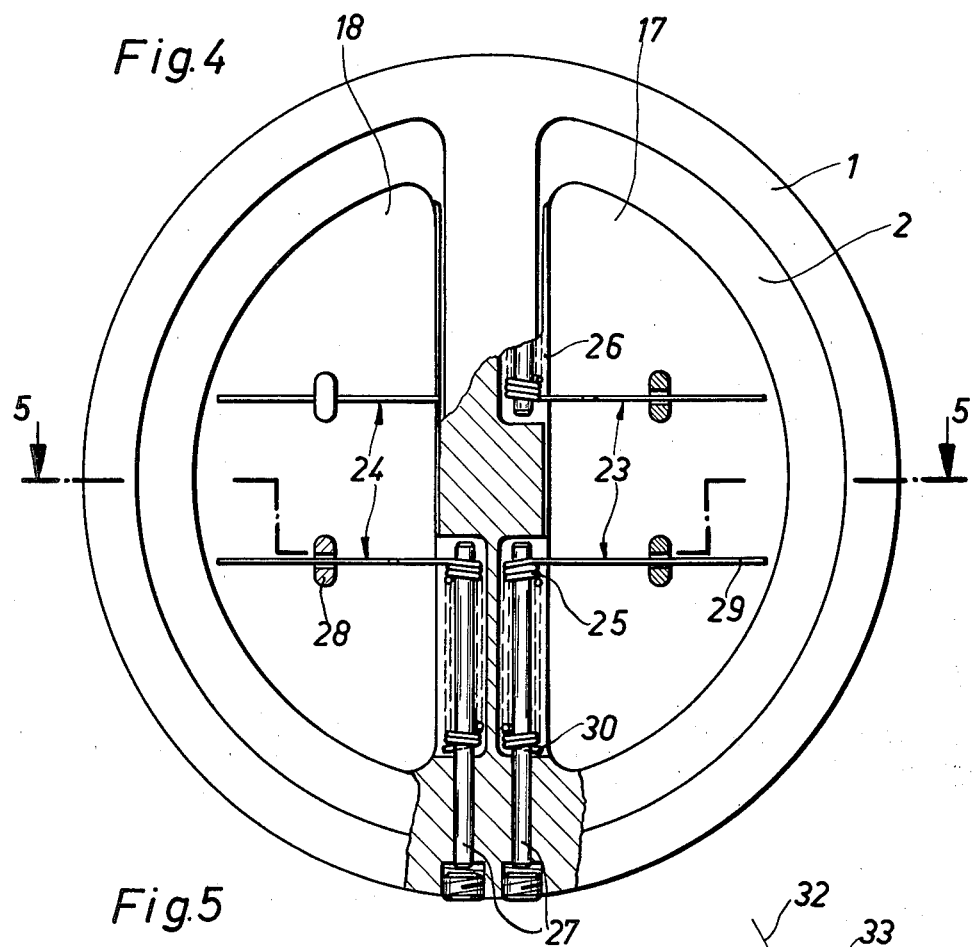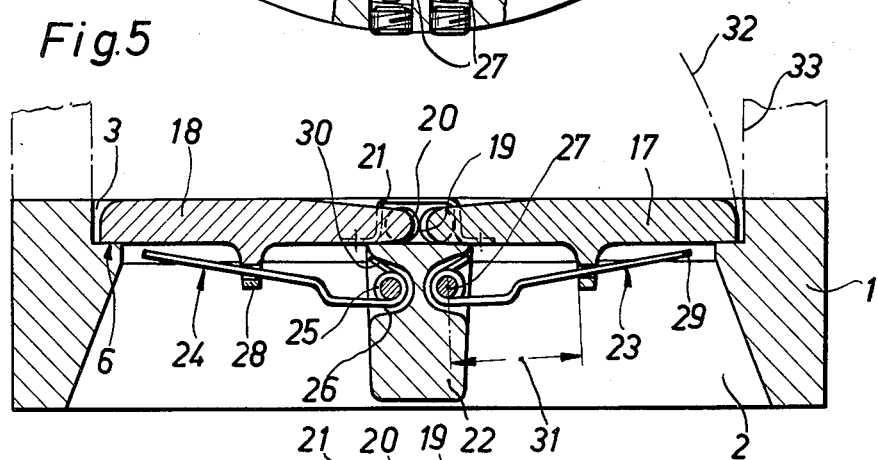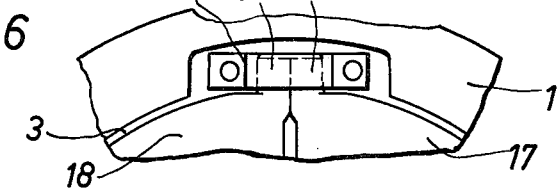

FLAP VALVE

The present invention relates to a flap valve, which is especially useful as either a pressure relief valve or a one-way, non-return valve. More particularly, it relates to a flap valve of the type which includes a valve housing having a valve seat formed therein, at least one locking member pivotably mounted in the valve housing and cooperating with the valve seat and at least one locking spring, one end portion of which is rigidly held in the valve housing and the other end portion of which engages the locking member.

In flap valves of the known types (see for example, German Laid Open Patent No. 2,426,084 and German Patent No. 1,153,955), the locking spring is in the shape of a shank or leg spring, the windings of which are received on the pivot axis or pin of the locking member and the ends of which form two spring shanks running laterally or normally to the winding axis. One or both ends of the spring shanks engage the locking member. Thereby, the locking spring carries out an increasing locking moment (i.e., an increasing spring tension) along with the increasing of the opening angle of the locking member. For completely opening the locking member of the flap valve, a relatively high flow charge is required which, however, is not always present with every changing operating conditions. Hence, flap valves of this type sometimes operate in a partially opened position whereby flapping and flow noises are common and wherein the flow resistance is relatively large.

It is, therefore, an object of the invention to provide a flap valve of the aforementioned type, wherein the locking springs exerts on the locking member or members only a slightly increasing and, preferably, a reducing locking moment or force over its opening angle, so that with only relative low flow quantities a complete opening of the flap valve is obtained. The object of the invention is obtained in accordance with the present invention by the provision of a flap valve of the aforementioned type which is characterized in that the locking spring is mounted in the flow inlet chamber of the valve housing and that cam means is provided for coupling the end portion of the spring, which serves as a pivotable lever arm, to the locking member in a manner allowing pulling action (traction) of the lever arm on the locking member in the pivot direction of the locking member and also allowing sliding movement of the arm and the locking member in the longitudinal direction of the lever arm relative to one another.

In view of the inventive arrangement of the locking spring, a displacement of the pivot arm axis of the locking spring takes place on the flow inlet side of the valve seat in front of the locking member pivot axis which is disposed on the opposite side of the valve seat. This results in an extension of the effective lever arm of the spring during the opening movement or a shortening of the effective lever arm of the locking member, which, in turn, effects the locking force exerted on the locking member by the locking spring. The changing of the effective length of the lever arms is superimposed on, and compensates for, the increasing torque moment of the locking spring, which is unavoidable during the opening movement. This permits the realization of a locking force on the locking member by means of the locking spring which is lower in the opening position than in the locking position.

In a preferred embodiment, the cam means includes an eyelet member mounted on a front face of the locking element facing the inlet chamber and the arm of the locking spring extends through the eyelet member and is axially moveable therein. In an alternate embodiment, the cam means includes an elongated groove formed in the front face of the locking element facing the inlet chamber which extends normally relative to the pivot axis of the locking element, and which has laterally-extending undercut portions. The end of the arm of the locking spring carries cross arms which are slideably received within the undercut portions of the groove of the locking member.

Preferably, the locking spring is in the shape of a shank spring having a plurality of helical windings and a shank secured thereto which serves as the lever arm. The spring may be locked in place in a stationary manner in the valve housing, mounting it on a bolt secured in the valve housing parallel to the pivot axis of the locking member. Most advantageously, the bolt is a one-ended shoulder pin which permits mounting of a spring of this type.

In a particular preferred embodiment of the invention, the flap valve is provided with two adjacent articulated locking members. Thereby, a sufficiently simple free moving of the lever arm of the locking spring is ensured.

Most advantageously, the locking spring is substantially disposed in a sunk position with respect to the flow of the medium which is favorable for obtaining a low flow resistance and the elimination of flow noises.

Other objects and features of the present invention will become apparent from the following detailed description when taken in connection with the accompanying drawings which discloses two embodiments of the invention. It is to be understood that the drawings are designed for the purpose of illustration only, and are not intended as a definition of the limits and scope of the invention disclosed.

In the drawings, wherein similar reference numerals denote similar elements throughout the several views:

FIG. 4 is an elevational front end view, in part section, of another embodiment of the inventive flap valve wherein two locking members are employed;

FIG. 5 is a sectional view taken along lines 5—5 of FIG. 4; and

FIG. 6 is a fragmentarilly-illustrated elevational rear end view of the flap valve shown in FIG. 4.

Figure 1:
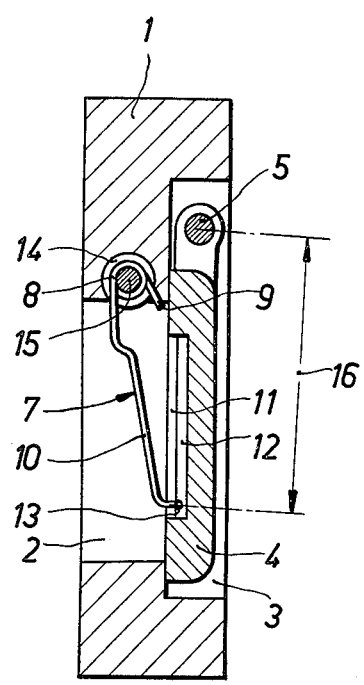
FIG. 1 is a sectional view of the inventive flap valve with a locking member in a closed position.
Figure 2:
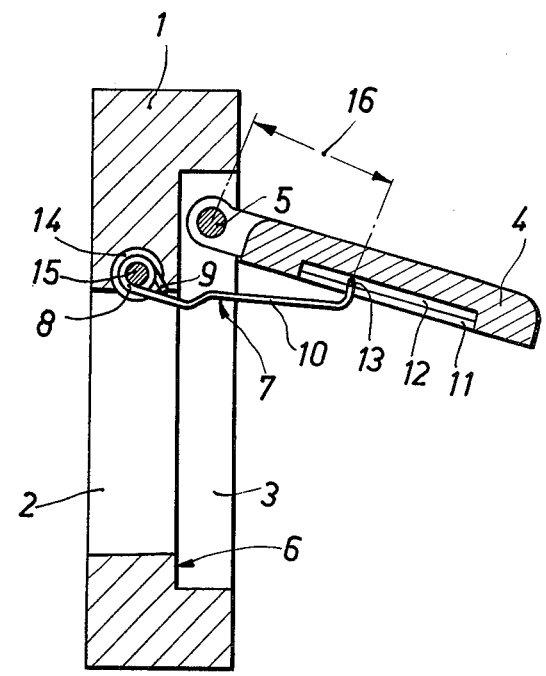
FIG. 2 is a sectional view similar to that of FIG. 1, but showing the locking member in an open position.
Figure 3:
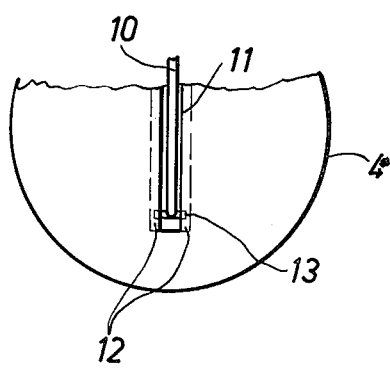
FIG. 3 is a fragmentarilly-illustrated elevational end view of the locking member of the flap valve shown in FIG. 1.

Referring now in detail to the drawings in the embodiment shown in FIGS. 1-3, a valve housing 1 is provided which comprises a flow inlet chamber 2 as well as a flow discharge or outlet chamber 3. A locking member 4 is pivotably mounted on a swivel axis or pin 5 provided in outlet chamber 3 and cooperates with valve seat 6 (see FIG. 2).

In the inlet chamber 2 of valve housing 1, a shank spring 7 is provided having helical windings 8, the end portions of which form two spring shanks 9 and 10 running normal to the axis of windings 8. The outer end of the shorter spring shank 9 is supported on valve housing 1, while the outer end of the longer spring shank 10 engages locking member 4 in the form of a lever. Locking member 4 is provided with an elongated groove 11, having cross or laterally-extending undercut portions 12, which groove 11 is formed in its front face, proximate to valve seat 6, in a perpendicular-extending direction, with respect to pivot axis 5. The free end of spring shank 10 is provided with slideable arms 13 extending laterally therefrom which are received within the undercut portions 12 of groove 11 and are longitudinally displaceable therein.

For mounting shank spring 7, the wall of inlet chamber 2 is provided with a pocket-like recess 14. Spring windings 8 are received within recess 14 so that they are in a sunk position relative to the medium flowing through the relief valve. Spring windings 8 are mounted on a receiving bolt 15, which is retained parallel to pivot axis 5 on valve housing 1.

As can be seen from a comparison of FIGS. 1 and 2, the point of engagement of arms 13 of spring shank 10 with locking member 4 changes continuously during the opening process (i.e., pivotal movement) of locking member 4 with respect to its axis 5. This is the result of the offset position of the pivot axis of the spring 10 on the flow inlet side of the valve seat 6, whose axis coincides with receiving bolt 15. Accordingly, the effective length of lever arm 16 which engages shank spring 7 decreases during opening. This action is superimposed over the increasing locking force at end 13 of spring shank 10. Despite the increase in spring force, a reduction of the closing force is obtained when opening locking member 4, disposed behind of locking spring 7.

The other embodiment of the inventive flap valve is shown in FIGS. 4 to 6, wherein two adjacent locking members or elements 17, 18 are pivotably supported on two adjacent, laterally-arranged pivot pins 19, 20, which, in turn, are mounted in yokes 21 provided in valve housing 1. Valve housing 1 is provided with a cross bar 22 which acts as a portion of the valve seat 6 for the adjacent inner edge portions of locking members 17 and 18. At the flow inlet side of each of the locking members 17 and 18, a pair of shank springs 23 and 24 are arranged, the windings 25 of which are mounted on both sides in cross recesses 26 provided in cross bar 22. Receiving bolts 27 each consist of a cantilever pin held by one of its ends in valve housing 1. Finally, the locking elements 17 and 18 are provided with eyelets 28 on their flow inlet front faces through which the longer spring ends 29 of shank springs 23 and 24, extend and are axially moveable therethrough, while the shorter spring shank 30 engages cross bar 22.

In this embodiment, the point of contact of spring shanks 29 of springs 23 and 24, with eyelets 28, continuously changes during opening of locking members 17 and 18 and it is displaced towards the free end of shank 29 during the opening movement. As a result, the increasing torque moment during the opening movement of the shank springs 23 and 24, are transmitted to an increasingly enlarging effective lever arm 31. Thereby, the torque moment of shank springs 23, 24 is compensated or exceeded, so that there is a reduction of the closing forces exerted on locking members 17 and 18, as the locking members open.

The disposition of shank springs 23, 24 in the flow inlet chamber 2 permits arrangement of the locking member pivot axis as close as possible to valve seat 6, since no more free space is available between the pivot axis and valve seat 6 for the springs. The pivotal opening of locking elements 17 and 18 is effected by the provision of separate pivot pins 19 and 20 associated with each locking element 17 and 18. The axial arrangement close to the valve seat requires a lower longitudinal discharge length for the housing structure, so that a larger dimensioned cross bar 22 may be provided. The advantage is that a high stiff resistance is achieved which permits high flow operating charges and a shorter longitudinal housing length. The cross bar rigidity is not influenced by recesses 26 in cross bar 22 for shank springs 23 and 24, since this placement is in a neutral zone as far as stress is concerned relative to the rigidity of cross bar 22.

With the locking member pivot axis spaced from the valve seat, which is a known mounting expedient, the outer edge sections of the two locking members which are positioned farthest away from the pivot axis, move in a circular curve during opening of the two locking members. This circular curve is directed radially outwardly at the beginning of the opening movement of the two locking members and is directed inwardly at a later point in time. The outwardly-directed movement component compels the use of correspondingly smaller locking members in comparison with the internal diameter of the connecting part adjoining the valve housing on the outflow side, for example, a pipe flange, in order to guarantee a free movement of the locking members.

The outer edges of the pivot pins 19, 20 of the locking members 17, 18 which are positioned adjacent the valve seat, as shown in FIGS. 4 to 6, first move in a radially inwardly directed circular curve 32 during the opening movement. This permits the use of particularly large locking members without affecting the freedom of pivot movement due to the connecting part 33 which is provided at the downflow side of the valve. This is particularly important when using flap valves having large nominal cross sections.

While only a few embodiments of the present invention have been shown and described, it will be obvious to those persons of ordinary skill in the art that many changes and modifications may be made thereunto without departing from the spirit and scope of the invention.

What is claimed is:

1. A flap valve comprising:
   a valve housing having a valve seat defined therein, on one side of which is a flow inlet chamber and on the other side of which is a flow discharge chamber;
   at least one locking member pivotably mounted in said valve housing for movement between an open and closed position relative to said valve seat;
   at least one locking spring mounted in the flow inlet chamber of said housing, said spring including one portion which is rigidly held in said valve housing and a pivotable lever arm which engages said locking member to urge such locking member into a closed position; and
   means for coupling said arm of said locking spring to said locking member in a manner allowing pulling action of said arm onto said locking member in the pivot direction of said locking member and for also allowing sliding movement of said arm and said locking member in the longitudinal direction of said lever arm relative to one another.

2. The flap valve according to claim 1, wherein said means for coupling includes an eyelet member mounted on a front face of said locking member facing said inlet chamber and wherein said arm of said locking spring extends through said eyelet member and is axially moveable therein.

3. The flap valve according to claim 1, wherein said means for coupling includes an elongated groove formed in a front face of said locking member facing said inlet chamber which extends normally relative to the pivot axis of said locking member, said groove having laterally-extending undercut portions and wherein the end of the arm of said locking spring carries cross arms which are slideably received within said undercut portion of said locking member.

4. The flap valve according to claim 1, wherein said locking spring is a shank spring having a plurality of helical windings and one shank which is secured to said windings and defines said lever arm and wherein a bolt is mounted in said valve housing parallel to the pivot axis of said locking member on which said shank spring and its associated windings is mounted.

5. The flap valve according to claim 4, wherein said bolt is a cantilever pin held by one of its ends in said valve housing.

6. The flap valve according to claim 1, wherein said valve includes two of said locking members disposed adjacent to one another which are pivotably mounted in said valve housing along their adjacent edges, and at least two of said locking springs, each of which is associated with one of said locking members and the pivot axes of which are radially spaced from one another.

7. The flap valve according to claim 1, wherein said inlet chamber of said valve housing has formed therein at least one pocket-like recess for receipt of at least a portion of said locking spring.

* * * * *